C. D. MILLER.
RANGE FINDER AND SPEED INDICATOR FOR AIRCRAFT.
APPLICATION FILED SEPT. 25, 1916.
1,235,909.
Patented Aug. 7, 1917.
4 SHEETS—SHEET 3.
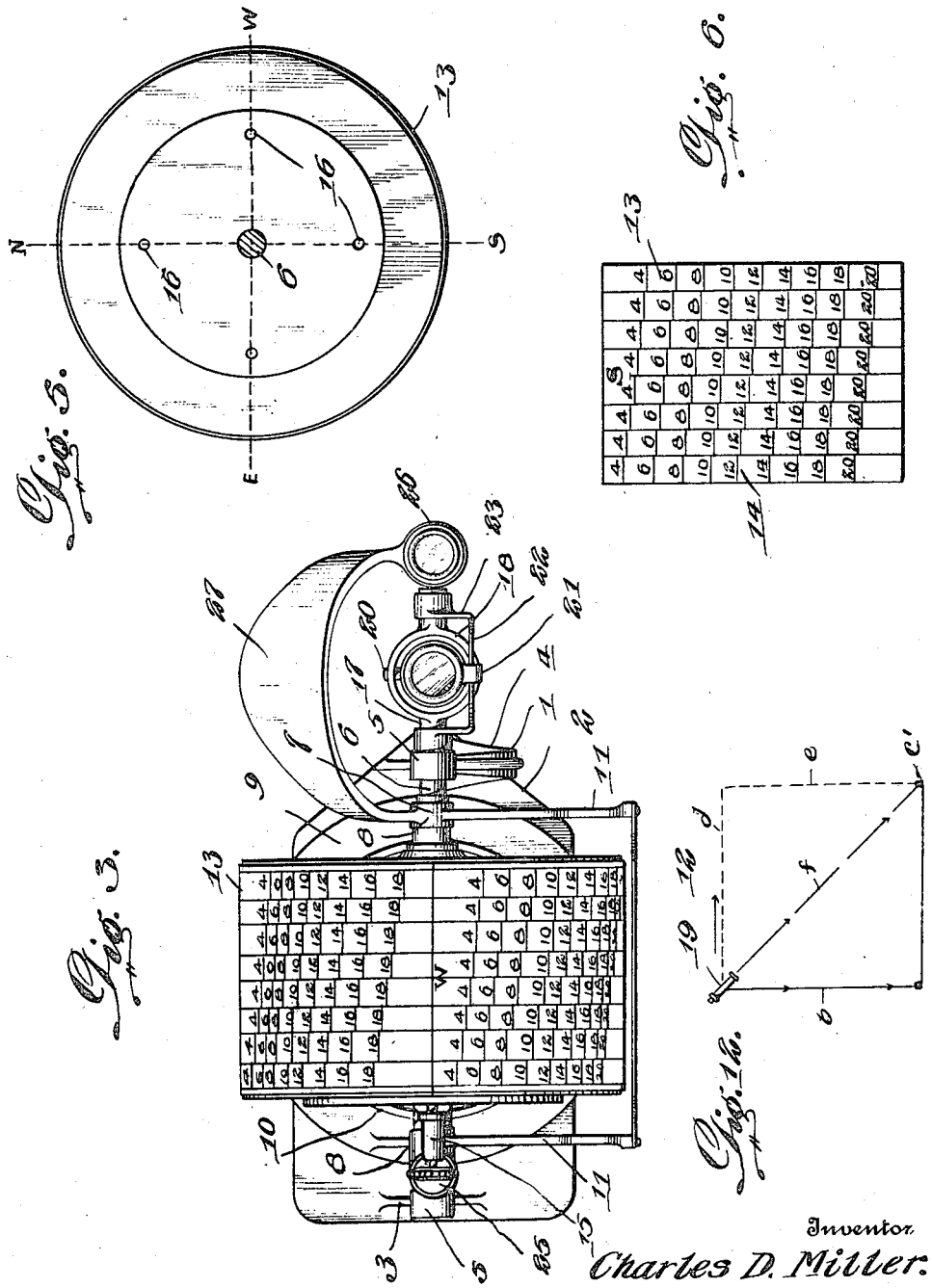
Inventor
Charles D. Miller.
Witness
Frederick L. Foe,
By Victor J. Evans.
Attorney

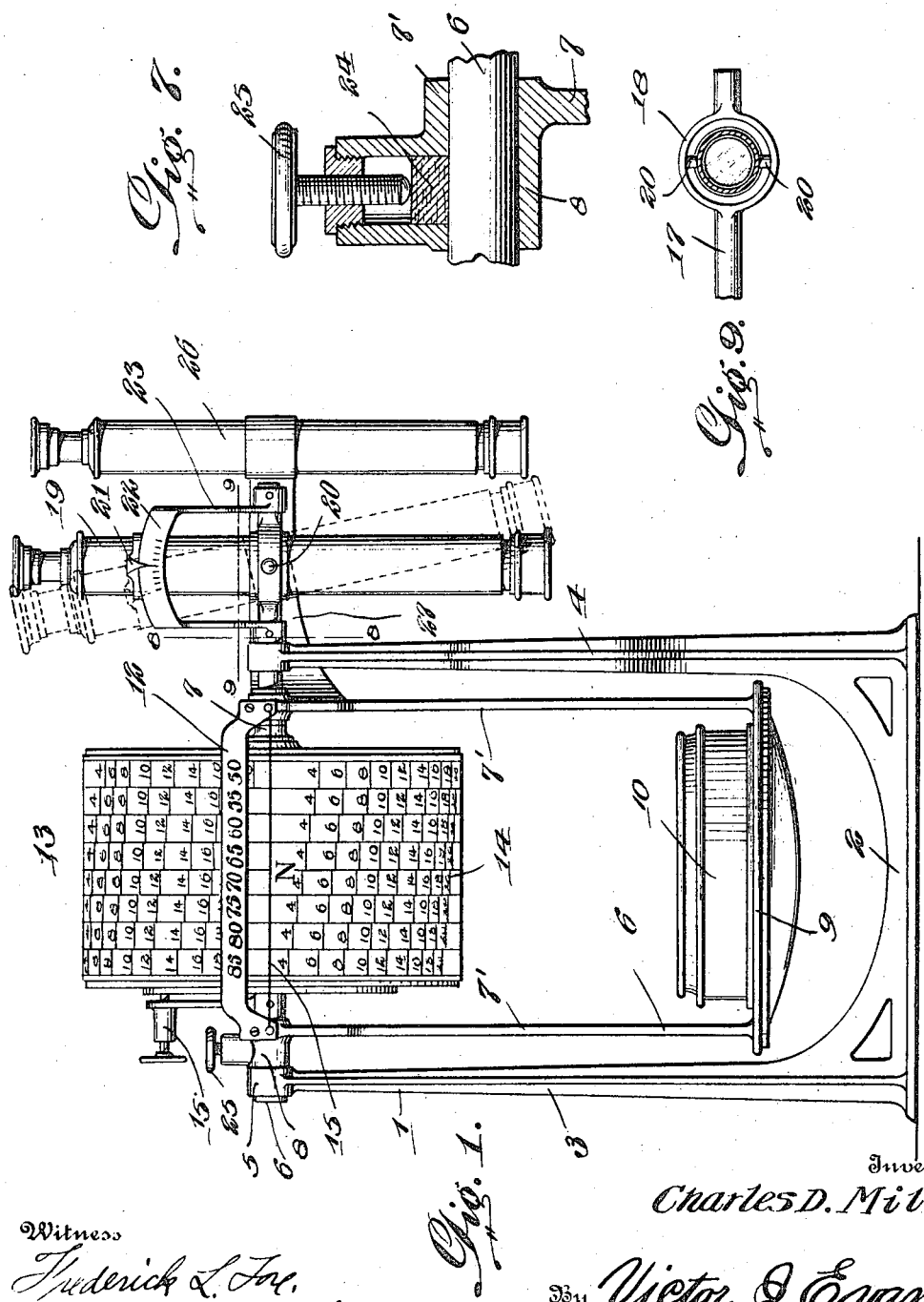

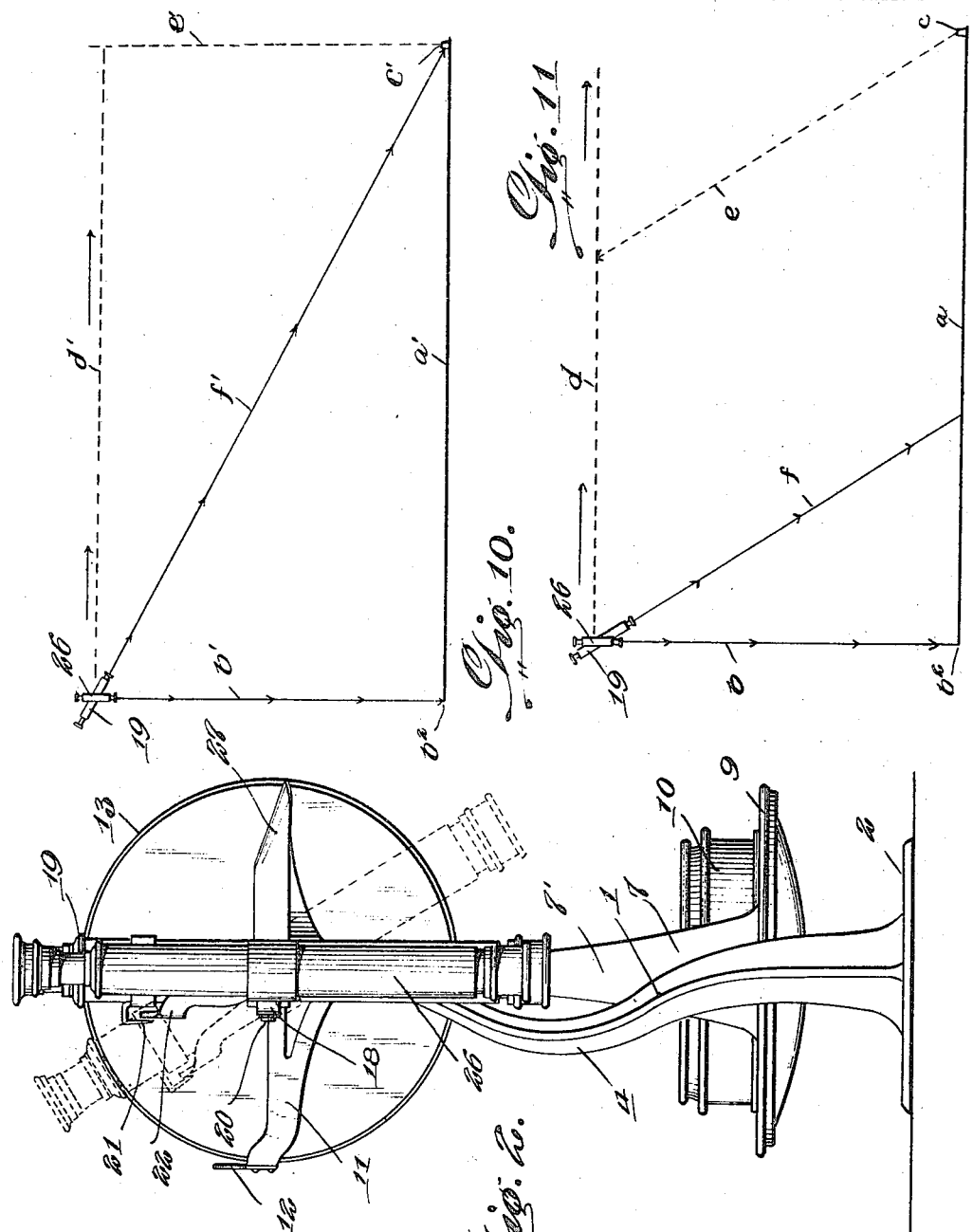

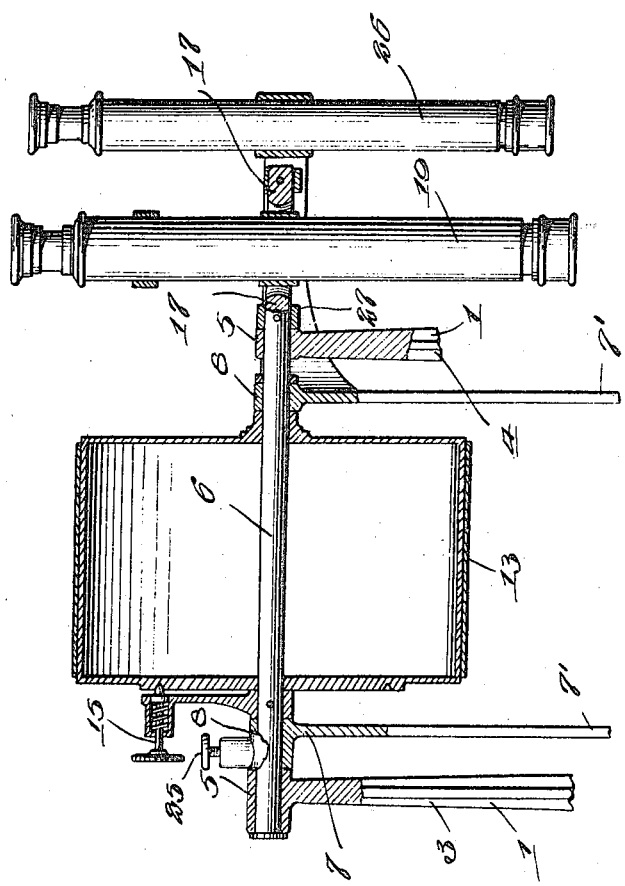

UNITED STATES PATENT OFFICE.

CHARLES D. MILLER, OF ALCOLU, SOUTH CAROLINA.

RANGE-FINDER AND SPEED-INDICATOR FOR AIRCRAFT.

1,235,909.          Specification of Letters Patent.      Patented Aug. 7, 1917.

Application filed September 25, 1916. Serial No. 122,105.

*To all whom it may concern:*

Be it known that I, CHARLES D. MILLER, a citizen of the United States, residing at Alcolu, in the county of Clarendon and State of South Carolina, have invented new and useful Improvements in Range-Finders and Speed-Indicators for Aircraft, of which the following is a specification.

This invention relates to a range finder and speed indicator for aircraft.

The main object of the invention is to provide a device for determining the instant at which a bomb or like projectile should be released in order to hit an intended object below, considered with regard to altitude, speed of travel of the aircraft, wind and other resistances, the trajectory or parabola of travel of the projectile, and other controlling factors.

Another object of the invention is to provide a device of the character described embodying means whereby the speed of travel of the aerial vehicle may be determined so that proper adjustment of the range finder may be made in accordance with the speed of travel at the time a bomb or projectile is to be released.

The invention consists of the features of construction, combination and arrangement of parts hereinafter fully described and claimed, reference being had to the accompanying drawings, in which:

Figure 1 is a face view of the range finder and speed indicator, indicating in dotted lines the lateral adjustability of the adjustable sighting device.

Fig. 2 is a side elevation of the same.

Fig. 3 is a top plan view.

Fig. 4 is a central vertical transverse section through the body of the instrument.

Fig. 5 is a side elevation of the angle indicating chart.

Fig. 6 is a plan view of one of the angle indicating scales thereof.

Fig. 7 is a detail section on line 7—7 of Fig. 1.

Fig. 8 is a detail section on line 8—8 of Fig. 1.

Fig. 9 is a detail section on line 9—9 of Fig. 1.

Fig. 10 is a diagrammatic view illustrating the method of determining the speed of the craft.

Fig. 11 is a similar view illustrating the operation in a range finding action.

Fig. 12 is a diagrammatic view illustrating the method of using the range finding telescope or sighting device for speed indication.

Referring to the drawings, 1 designates in general the supporting frame of the instrument, which embodies a base 2 and a pair of parallel upright arms 3 and 4, the base 2 being secured in practice to any suitable portion of the aerial vehicle so as to normally stand in an upright or perpendicular position. The arms 3 and 4 are provided at their upper ends with bearings 5 in which is journaled a horizontal transverse shaft 6, from which shaft is loosely suspended a yoke 7, the arms 7' of which are arranged between the frame arms 3 and 4 and provided at their upper ends with bearing members 8 loosely engaging the shaft, said arms 7' being connected at their lower ends by a bracket 9 forming a support for a compass 10, arranged so as to be conveniently consulted by the aeronaut for indicating the direction of travel of the craft. The yoke, the swinging frame and compass serve the function of a weighted pendulum influenced by gravity so as to normally maintain a perpendicular position, irrespective of the deviations of the frame 1 from a perpendicular position in the adjustments of the adjustable parts of the instrument or deviations of the craft from a normal flying attitude in a fore and aft direction. In practice the instrument is mounted upon the craft so that the arms 3 and 4 of the frame 1 aline in a straight transverse direction and so that the supporting frame and pendulum yoke have relative movement in a longitudinal or fore and aft direction. Projecting from the bearing members 8 in parallel relation beyond the face of the instrument are bracket arms 11 which are connected at their free ends by a transverse scale bar or plate 12 bearing upon its face a speed indicating scale shown in the present instance as having a range of from fifty to eighty-five miles per hour progressively increasing in the ratio of five miles per hour between the initial and final figures of the scale. It will be understood, however, that any suitable range of the speed indications upon the scale may be employed.

The speed indicating scale 12 is arranged for coöperation with an angle indicating device or chart 13, shown in the present instance in the form of a cylindrical drum which is mounted for rotation on the shaft 6 to different indicating positions. This drum is provided upon its periphery with one or more indicating scales 14. Each of these scales is provided with circumferentially arranged subdivisions, each subdivision containing a row of numerals indicating angularity of degrees of adjustment of the drum to set the sighting device, hereinafter described, for operation for a range finding action according to the altitude of the craft from the earth's surface, the figures of each row progressively indicating elevation in hundreds of feet. In the present instance the figures of each row are shown as indicating altitudes from four to twenty, representing distances of from four hundred to two thousand feet at regular intervals of two hundred feet. The rows of numerals of each scale are equal in number to and arranged to register with the respective speed indicating numerals of the scale 12, for indicating angularities of adjustment to which the drum should be set for a bomb releasing action with regard to the altitude of the craft and its speed of travel, in order that the projectile may be released at the exact moment to strike an intended object or target below, figured with regard to the altitude and speed of the craft, wind and other resistances, the trajectory or parabola covered by the bomb or projectile in its course of travel, and other governing factors, the indicating scale being properly calibrated for such purposes. For the purpose of indicating progressive variations in the angular disposition of the sight object to time the moment of release of the bomb or projectile, which varies at the same altitude at different speeds of flight of the aerial vehicle, the rows of figures of the angle indicating scale are arranged in stepped order, so as to progressively begin at different distances from the zero point, to degrees proportionate to the variations in the angular adjustment of the drum at the same altitude, but at different speeds, the numeral 4 of the fifty mile division of the angle indicating scale being arranged the farthest from and the numeral 4 of the eighty-five mile angle indicating scale the closest to the zero line of the scale, as will clearly appear by reference to Figs. 1, 3 and 6 of the drawings.

The zero point of any determined angle indicating scale of the drum is adapted to register with a relatively fixed indicator 15 in the form of a hair line extending transversely beneath the speed scale 12 and suitably mounted on the yoke 6, whereby accurate adjustments of the angle indicating means may be obtained. As shown in the present instance, the periphery of the drum is divided into quarters, respectively bearing the designating abbreviations of the four quarters of the earth, North, South, East and West, and each of which quarters is provided with an angle indicating scale of the character described. These scales of the four quarters differ, however, in the relative arrangement of the numerals with respect to the zero points of the scales, to correspond with such variations of angularities which exist in the travel of the machine toward the different compass points and due to the earth's motion. These variations, while comparatively small, are a factor in obtaining absolute accuracy especially in the dropping of bombs or projectiles from a craft traveling at very high speed. Any one of the scales may be brought into operative position with relation to the speed scale and hair line by the rotation of the drum on its axis, and, for the purpose of holding the drum in any of its adjusted positions, a spring actuated locking device 15 is provided to engage any one of a series of recesses 16 in the drum for holding the drum in any of its operative positions.

One end of the shaft 6 is provided with an extension 17 projecting laterally beyond the bearing 5 and this extension 17 is formed or provided with a supporting ring 18, through which passes a sighting device in the form of a telescope 19. This telescope is provided at a point intermediate of its length with trunnions 20 arranged diametrically opposite each other in a fore and aft direction, whereby said telescope is pivotally mounted for lateral movements. The degree or angularity of these lateral movements may be measured or determined by means of a pointer 21 carried by the telescope for coöperation with an angle indicating scale upon a scale bar 22 provided with arms 23 which are fixed to the shaft extension 17. By this construction it will be seen that the telescope is mounted for swinging movements with the shaft 6 in a fore and aft direction and is mounted for swinging movements upon said shaft and independently thereof in a lateral or transverse direction. By employing the telescope as a lever or operating handle, it will be obvious that the shaft and drum may be shifted as a unit to different angular positions with relation to the speed scale and hair line, which are always maintained in a perpendicular position, so as to set the telescope for a sighting action forwardly in the direction of travel at a desired angle according to the speed of travel, while by also moving the telescope laterally sight direction may be made for any lateral or side drift to be taken into consideration, in accordance with any lateral deviation from a straight line course of travel indicated by the drift meter of the craft. For the purpose of maintaining the range finding elements in any position of angular adjustment, a suitable friction device is provided consisting in the present instance of a friction block 24 mounted upon one of the yoke bearings 8 and adjustable by means of a screw 25 into engagement therewith whereby the drum 13 and telescope 19 when adjusted to any angle will be held in a fixed position with the pendulum yoke against movement under any variation of the aircraft from a longitudinally balanced position.

For coöperation with the range finding mechanism above described, I preferably provide a means for determining the speed of travel of the craft by a triangulation, which means is shown as consisting in the present instance of a telescope 26 arranged normally in a perpendicular position and in transverse alinement with the shaft 6 and telescope 19. This telescope 26 is supported upon one of the ends of a segmental bracket 27 arranged in rear of the shaft extension 17 and suitably connected at its opposite end with one of the arms 11 or some other suitable part of the pendulum yoke, whereby the telescope 26 is normally maintained by the yoke and with the scale 12 and hair line 15 in a fixed position, the weight of the telescope 26 being counterbalanced by the weight of the bracket 27 which counterbalances the weight of the arms 11 and scale bar 12, as will be readily understood. The telescope or sighting device 26, in addition to serving as a speed determining element, is also adapted for use in conjunction with the telescope 19 in facilitating range finding actions, especially in cases where the topography of the ground is more or less accurately known.

In the use of the device for a range finding action, the drum being set for the employment of the proper angle indicating scale, and the speed of the craft being known or determined, and the altitude being estimated by reference to the barograph, it will be understood that the telescope 19 is adjusted until the proper angle indicating numeral on the drum in register with the speed indicating numeral on the scale 12 comes into registration with the hair line 15, whereby the telescope 19 is set at the proper angle to the perpendicular for a bomb releasing action at the time when the object to be struck comes into sight through the telescope. This will be understood by reference to Fig. 11, in which $a$ represents a base line, which may be at any point of the earth's surface. $b$ the perpendicular indicated by the pendulum and telescope 26, $c$ the target or object to be struck, $d$ the line of flight of the craft and $e$ the angle of release, constituting the line of sight through the telescope 19 when the object comes into view therethrough. Hence it will be apparent that the telescope 19 being set at the proper angle, according to altitude and other controlling factors, the operator, in the forward travel of the craft, keeps his eye trained through the telescope from the initial angle or line of sight $f$ until the line of sight $e$ is reached and the object $c$ is brought into view, whereupon the bomb or other projectile is dropped. The angle $e$ being calculated with regard to all governing factors, the dropped projectile will in its trajectory or parabola of motion describe a course which will cause it under the normal conditions to strike the target or object $c$ or explode within a desired range of proximity thereto. If the drift meter of the craft should show that there is a certain degree of side drift or deviation from a straight line of flight, this may be compensated or allowed for by laterally adjusting the sighting device or telescope 19 to a corresponding degree, as will be readily understood.

In Fig. 10 I have shown diagrammatically the mode of employing the telescope for a speed determining action by the process of triangulation, $a'$ indicating the base, represented by the earth's surface $b'$ the line of the perpendicular coincident with the line of vision through the telescope 26 whereby said telescope may be trained upon a point $b^2$ at the angle of intersection of the lines $a'$ and $b'$, $c'$ a sight object in the line of flight at a distance from the object $b^2$, $d'$ the line of flight of the craft, $e'$ a final indicating line of sight parallel with the line $b'$ and in the perpendicular plane of the object $c'$, and $f'$ the line of sight along which the operator initially inspects the object $c'$ through the telescope 19. In Fig. 10 I have shown diagrammatically the mode of employing the telescopes for a speed determining action by the process of triangulation.

The indicating elements being in normal position, the telescope 19 is adjusted to any given angle preferably 45 degrees; the telescope 26 remaining always perpendicular, the operator trains the telescope 19 on any object $c'$ in the straight line of flight, and takes the time consumed between sighting the object through telescope 19 and the time of passing over the object as seen through telescope 26. The distance traveled in the above case between the sighting of the object through the two telescopes would obviously be the same as the height of the aircraft, and by taking the time elapsing between same the speed of travel of the aircraft may be accurately determined under all conditions.

In Fig. 12 I have diagrammatically illustrated a method of using the range finding telescope for a speed indicating action, thus obviating the necessity of using more than one telescope on the device. In this operation the telescope 19 is adjusted to any given angle with relation to the perpendicular, preferably 45 degrees for use in calculation. The operator then trains the telescope on any object, as $c'$ in the shaft line of flight afterward shifting the telescope to a perpendicular position, and takes the time consumed between initially sighting such object and the time of passing over the object as later seen through the perpendicular telescope. The distance traveled in the above case between the initial and final sighting of the object would obviously be the same as the height of the air craft, and by taking the time elapsing between same the speed of travel of the aircraft may be accurately determined.

It will, of course, be understood that as the frame structure 2 is fixed to the craft the said frame structure will move out of a perpendicular position with the craft when the latter longitudinally tilts or dips out of a balanced position, but that, due to the force of gravity, the pendulum yoke 7 and the indicating elements 12 and 15 carried thereby, as well as the telescope 26, will always maintain a vertical position, insuring accuracy in the use of the instrument.

I claim:—

1. A range finder for air craft embodying a sighting device adjustable longitudinally and laterally with relation to the craft, and means for indicating angularities of adjustment of said device in both directions from a normally perpendicular position, the means for indicating angularities of adjustment in the longitudinal direction being calculated with regard to speed and altitude.

2. A range finder for air craft comprising a supporting member adapted for attachment to the craft, a speed scale pivotally mounted upon said supporting member and including means for maintaining it in a fixed position to the vertical, an angle indicator movable with relation to said scale, and a sighting device for adjusting said angle indicator.

3. A range finder for air craft comprising a support adapted for attachment to the craft, a speed scale movably mounted on the support and including means for maintaining it in a fixed position to the vertical, an angle indicator adjustable with relation to said speed scale, and a sighting device movable with said angle indicator in a longitudinal direction and movable independently of said indicator in a lateral direction.

4. A range finder for air craft comprising a supporting member adapted for attachment to the craft, a speed scale having a series of indicia indicating different speeds, means for maintaining said scale in a fixed position to the vertical, an angle indicator adjustable with relation to the speed scale and having rows of indicia for coöperation with the speed indicia, varied in series to indicate different angles at different speeds, and a sighting device adjustable with the angle indicator.

5. A range finder for air craft comprising a supporting member, a speed indicating scale, means for maintaining the same in a fixed position to the vertical, and an angle indicator having a plurality of indicating scales for coöperation with the speed indicating scale to indicate different angles at different speeds and variations according to the direction of travel of the craft, means for adjusting said angle indicator to bring one or the other of the scales thereof into position for coöperation with the speed scale, and a sighting device adjustable with the angle indicator for coöperation with any of its scales and said speed indicator.

6. A range finder for air craft comprising a supporting member, a shaft, a sighting device for revolving said shaft, a speed scale mounted on the shaft, means for maintaining said speed scale in a fixed position to the vertical, and an angle indicator mounted on the shaft and movable therewith for coöperation with the sighting device and speed scale.

7. A range finder comprising a relatively stationary supporting member, a shaft journaled therein, a sighting device movable with the shaft, a speed scale pivotally mounted upon the shaft, gravity controlled means for maintaining said speed scale in a fixed position to the vertical, a drum revolubly mounted on the shaft and having a series of angle indicating scales adapted to be brought into position for coöperation with said speed scale, and means for holding the drum in adjusted position.

8. A range finder and speed indicator for air craft, comprising a support adapted for attachment to the craft, a speed scale pivotally mounted upon said frame, gravity controlled means for normally maintaining said speed scale in a fixed position to the vertical, a sighting device normally maintained in a perpendicular position by the same means, an angle indicator adjustable with relation to the speed scale, and a second sighting device adjustable with said indicator.

In testimony whereof I affix my signature.

CHARLES D. MILLER.